United States Patent [19]
Malmasson

[11] Patent Number: 5,406,596
[45] Date of Patent: Apr. 11, 1995

[54] DEVICE FOR THE SEALED CLAMPING AGAINST A SUPPORT SURFACE OF AN INSTRUMENTATION COLUMN

[75] Inventor: Jacques Malmasson, Evry, France

[73] Assignee: Framatome, Courbevoie, France

[21] Appl. No.: 187,917

[22] Filed: Jan. 28, 1994

[30] Foreign Application Priority Data

Feb. 3, 1993 [FR] France ............... 93 01180

[51] Int. Cl.6 .............. G21C 19/00; G21C 13/00
[52] U.S. Cl. .................... 376/203; 81/57.3;
81/57.36; 376/204; 376/260
[58] Field of Search .............. 376/203, 204, 260;
81/57.36, 57.38, 57.22, 57.3, 57.14

[56] References Cited

U.S. PATENT DOCUMENTS

| 1,800,248 | 4/1931 | Coates ............... 81/57.36 |
| 1,901,436 | 3/1933 | Coates. |
| 2,069,882 | 2/1937 | Hall ................. 81/57.36 |
| 2,781,682 | 2/1957 | Herndon ............ 81/57.22 |
| 2,972,918 | 2/1961 | Huff et al. |
| 2,978,936 | 4/1961 | Orner .............. 81/57.36 |
| 3,322,205 | 5/1967 | Amtsberg et al. |
| 3,757,613 | 9/1973 | Arndt et al. ........ 81/57.22 |
| 3,905,254 | 9/1975 | Palatnick et al. .... 81/57.22 |
| 4,653,172 | 3/1987 | Hackley ............. 376/203 |
| 4,655,483 | 4/1987 | Margotta ........... 376/203 |
| 4,807,262 | 2/1989 | Shields ............. 376/203 |
| 5,069,862 | 12/1991 | Frizot ............. 376/260 |
| 5,074,170 | 12/1991 | Shirley ............ 81/57.36 |
| 5,084,228 | 1/1992 | Lhwillier ........... 376/203 |
| 5,218,758 | 6/1993 | Nguyen ............. 81/57.22 |

FOREIGN PATENT DOCUMENTS 2642217 7/1990 France.
0770773 10/1980 U.S.S.R. ............ 81/57.36

OTHER PUBLICATIONS

Abstracts SR 91 03 040 (1991).

Primary Examiner—Behrend E. Harvey
Attorney, Agent, or Firm—Pollock, Vande Sande & Priddy

[57] ABSTRACT

The device includes a removable supporting end piece (26) which comes to rest on the top end part of a support assembly (21) fixed to the end of a port adapter of the head of the vessel of a nuclear reactor, and a pressure plate (28) including an odd number of lifting screws (31), so as to move the instrumentation column (22) upward and to clamp it against a support surface (24). A tightening assembly (35) for the lifting screws includes a tightening spindle (42a) having an end part (45) shaped to receive a tool (40) for rotating the spindle, and in turn rotates tightening spindles mounted so as to idle in the mounting plate (38) of the tightening assembly (35). The tightening spindles comprise shaped end parts (46a) coming into engagement with drive parts (31b) of the lifting screws (31) of the pressure plate (28), so as to tighten all the lifting screws simultaneously.

9 Claims, 5 Drawing Sheets

DEVICE FOR THE SEALED CLAMPING AGAINST A SUPPORT SURFACE OF AN INSTRUMENTATION COLUMN

FIELD OF THE INVENTION

The invention relates to a device for the sealed clamping against a support surface of an instrumentation column and, in particular, of a thermocouple column, passing through the head of the vessel of a pressurized-water nuclear reactor.

BACKGROUND OF THE INVENTION

In pressurized-water nuclear reactors, the vessel containing the core of the reactor includes a substantially hemispherical head having openings in which there are fixed adapters allowing the passage of control rods of the reactor and instrumentation columns such as cylindrical thermocouple columns. A set of thermocouples is arranged in each of the thermocouple columns, making it possible to measure the temperature of the coolant fluid at the outlet of a set of assemblies of the core of the reactor.

Each of the adapters includes a part projecting under the head providing guidance for the thermocouple column, and a part projecting above the head including means for connecting a tubular assembly for supporting and sealing the thermocouple column, and which can be fixed into the extension of the adapter.

Inside the support assembly fixed to the adapter there is a shoulder against which a part of the thermocouple column comes to bear, with interposition of a sealing gasket.

The thermocouple column which passes through the bores of the support assembly and of the adapter, which are located in the axial extension of one another, includes an end which projects from the support assembly which is engaged with a device for clamping by pulling on the thermocouple column in the axial direction, so as to compress the sealing gasket between the thermocouple column and the support surface.

The device for sealed clamping by pulling on the thermocouple column may include, as described in FR-A-2,642,217, a pressure plate having a central opening making it possible to engage it over the end part of the thermocouple column, and including lifting screws each of which is engaged in a tapped hole passing through the pressure plate in a direction parallel to and distributed about the axis of the central opening. Each of the screws includes a first end projecting the plate, and coming to bear on the top part of the support assembly of the thermocouple column, and a second end projecting from a second face of the pressure plate which includes a shaped part making it possible to turn the lifting screw about its axis, inside the tapped hole. A two-part pull-ring may be interposed between the pressure plate and a radially projecting part of the thermocouple column, after engaging the pressure plate over the end part of the thermocouple column.

By rotating the screws using a manual tool, the pressure plate and, by means of the pull-ring, the thermocouple column, are raised, then the seal is clamped between the thermocouple column and the support surface of the support assembly.

In order to carry out effective and sealed clamping of the thermocouple column against the support surface, it is necessary to tighten each of the lifting screws to a specific constant torque for all the screws.

This clamping is generally carried out in two steps, a first clamping operation being performed before starting up the reactor, and a second complementary clamping operation being performed after a first rise in pressure inside the vessel of the reactor.

Four compression screws, placed at 90° about the axis of the pressure plate, or preferably six screws placed at 60° about the axis of the pressure plate, are generally used.

When six lifting screws are used, the time necessary for tightening them is of the order of 10 to 15 minutes, during which time the operator performing the manual tightening and monitoring the torque is exposed to the radioelement emissions coming from the contaminated surfaces of the head and of the adapters.

In addition, tightening any screw to a given torque changes the tightening torque of the adjacent screws. It is therefore very difficult to ensure uniform and satisfactory tightening of all lifting screws of the pressure plate and of the thermocouple column.

Furthermore, the use of an even number of screws does not allow the forces to be distributed properly over the periphery of the column, owing to the presence of pairs of screws in diametrically opposed positions.

Finally, the lifting screws bear directly on the end part of the support assembly which is securely fastened to the adapter. This results in conditions for taking up forces which can vary and which are not always optimal.

SUMMARY OF THE INVENTION

An object of the invention is therefore to provide a device for sealed clamping against a support surface of an instrumentation column, and in particular, a thermocouple column, passing through the head of a pressurized-water nuclear reactor vessel, inside tubular adapter fixed into an opening for passing through the vessel head, projecting towards the inside and towards the outside of the head, the sealed support surface for the instrumentation column being inside a tubular support assembly fixed to the end of the adapter located on the outside of the head and in the extension of the adapter, and the instrumentation column having one end which projects from the end of the support assembly opposite the adapter, the clamping device including a pressure plate having a central opening for the passage of the instrumentation column, and at least three lifting screws, each one engaged in a tapped hole passing through the pressure plate, distributed about and parallel to the axis of the central opening, each one including a supporting end and an opposite end constituting an engagement means for rotating the screw and a pull-ring made up of two half-rings coming to bear, in the axial direction, against a radially projecting part of the instrumentation column, this clamping device making it possible to clamp the instrumentation column against the support surface rapidly and effectively, with a clamping force which is constant over the entire periphery of the support surface.

To this end, the pressure plate includes an odd number of lifting screws, and the clamping device further includes:

a removable supporting end-piece which comes to rest on the end of the support assembly having a central opening for the passage of the instrumentation column, a tightening assembly including a mounting plate having an opening for the passage of the instrumentation column and tightening spindles distributed about and parallel to the axis of the opening of the mounting plate, each one including an end shaped for engagement with a means for rotating one screw of the pressure plate, the spindles being mounted rotationally on the mounting plate and securely fastened to gearing in kinematic connection, so as to be rotated in the same direction upon rotation of one of the spindles which includes a shaped drive part, and a tool for rotationally driving the spindle including the drive part.

BRIEF DESCRIPTION OF THE DRAWINGS

In order to make the invention easy to understand, there will now be described, by way of example, and with reference to the attached drawings, a pressurized-water nuclear reactor thermocouple column including a clamping device according to the prior art, and a thermocouple column including a clamping device according to the invention.

DESCRIPTION OF THE PREFERRED EMBODIMENT

Figure 1:
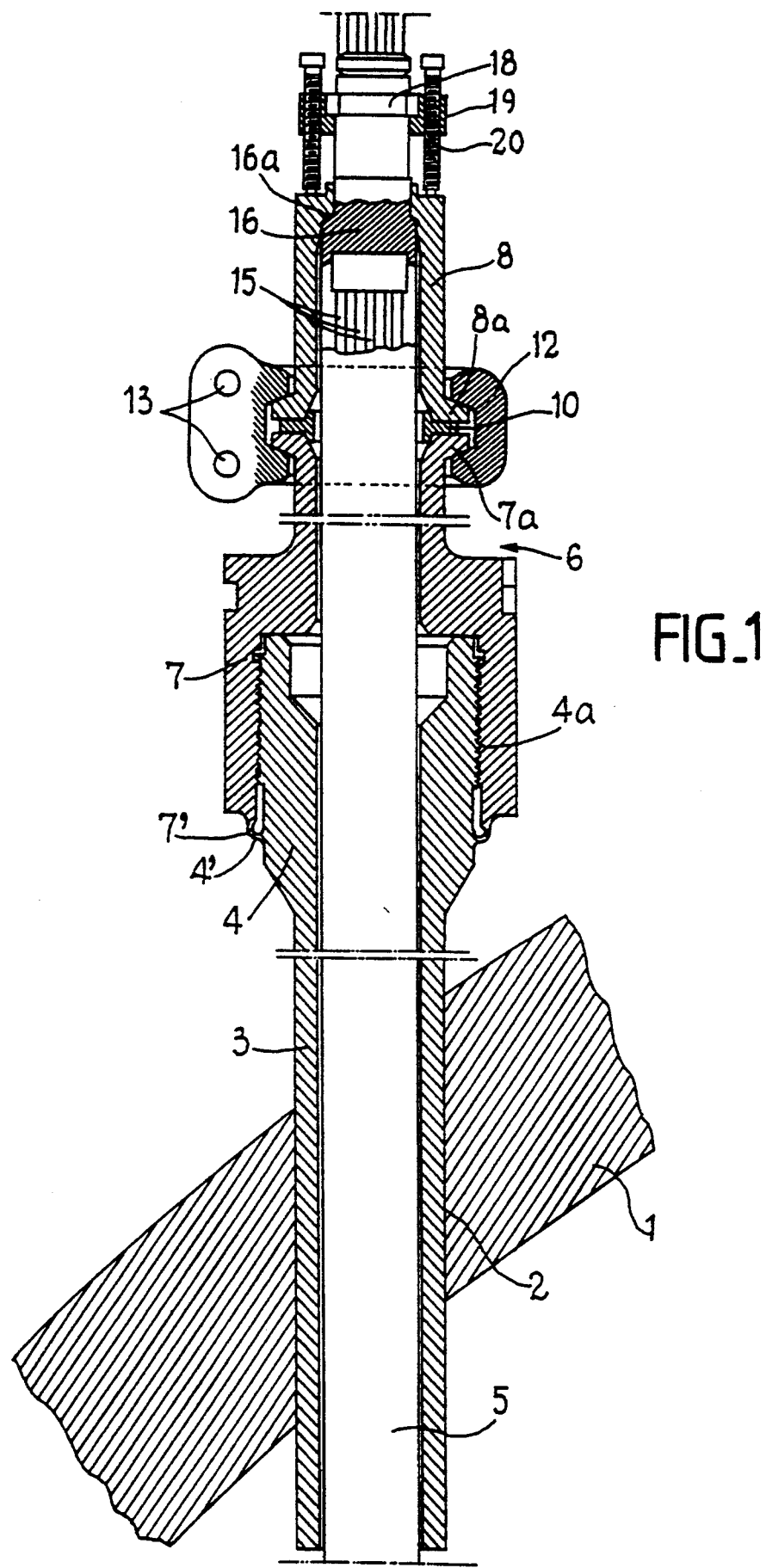
FIG. 1 is a view in section through a vertical plane of a port of the head of the vessel of a nuclear reactor providing the passage for a thermocouple column equipped with a clamping device according to the prior art.

FIG. 1 shows part of a vessel head 1 of a pressurized-water nuclear reactor traversed by an opening 2 in which there is fixed, in a sealed manner by welding, an adapter 3 including a part projecting below the vessel head providing guidance for a thermocouple column 5, and a part projecting above the vessel head 1 constituting a flared part 4 with a threaded external surface 4a.

On the top part 4 of the adapter 3 there is fixed, in the axial extension of the adapter 3, an assembly 6 for fixing and sealing the thermocouple column 5, by means of a bottom part 7 including a tapped bore which is engaged over the threaded part 4a of the flared part 4 of the adapter 3. The fixing and sealing assembly for the thermocouple column 5 is thus assembled at the end of the extension 3. The flared part 4 of the extension 3 and the bottom part 7 of the fixing and sealing assembly 6 includes circular seals 4', 7' which coincide when the part 7 is entirely screwed onto the flared part 4. The seals 4' and 7' are connected by welding so as to ensure sealing of the screwed connection between the components 4 and 7.

The head and the port adapters 3 are produced at the factory and transported to the site where the nuclear reactor is installed.

The fixing and sealing devices 6 for the thermocouple columns 5 are attached and fixed to the top ends of the adapters 3 on the site of the reactor.

The bottom part 7 of the fixing and sealing assembly 6 is fixed onto the end of the extension so as to be able to be dismantled if need be by melting the junction zone of the seals 4' and 7'. This dismantling is only carried out for repairs or exceptional intervention on the thermocouple column port.

The fixing and sealing assembly 6 includes a top part 8 which is assembled in a sealed manner to the bottom part 7 with the interposition of a metal seal 10 of a special shape, the parts 7 and 8 of the fixing and sealing assembly being assembled by means of a clamping flange 12, having two parts which can be joined together and clamped by means of screws inserted through openings 13 passing through opposing lugs located at the end of the two sector-shaped parts.

The clamping flange includes frustoconical bearing surfaces on its inside, these surfaces coming into clamping contact with corresponding frustoconical bearing surfaces machined on end flared parts 7a and 8a respectively of the bottom part 7 and of the top part 8 of the fixing and sealing assembly.

The adapter 3 and the fixing and sealing assembly 6 are tubular and are located in the axial extension of one another, so as to provide a passage for the thermocouple column 5, constituted by a tube for supporting and holding a set of thermocouples 15.

The thermocouple column includes a support and sealing component 16 at its top end, inside the support assembly, this component 16 comprising a frustoconical sealing face 16a which interacts with a corresponding frustoconical shoulder inside the bore of the top part 8 of the support assembly. A metal sealing gasket is interposed between the two coinciding frustoconical bearing surfaces.

Above the solid component 16, the thermocouple column includes a part which projects from the end of the top part 8 of the support assembly, in which is machined a groove allowing the engagement of a pull-ring 18 made up of two half-rings which can be engaged laterally in the annular groove. A pressure plate 19 includes lifting screws 20 engaged axially through the plate 19, and a lip engaging under the pull-ring 18.

The end of the lifting screws 20 comes to bear directly on the top surface of the part 8 of the support assembly of the fixing and sealing device.

By screwing the lifting screws 20, the pressure plate 19 is raised, and comes to bear on the pull-ring 18 of the thermocouple column 5. The thermocouple column is thus raised inside the bore of the support device 7, 8, then the sealing gasket associated with the frustoconical bearing surface 16a of the thermocouple column is made to bear on the corresponding shoulder machined in the bore of the top part 18 of the support assembly. Sealed fixing of the thermocouple column inside its support assembly is thus obtained, the pressure plate 19, the lifting screws 20 and the pull-ring 18 constituting the device for sealed clamping of the thermocouple column.

The sealed clamping of the thermocouple column 5 is produced with the aid of a hand tool such as a torque wrench with which the screws 20 passing through the pressure plate 19 are successively tightened. An even number of lifting screws 20 is used, placed in positions which are diametrically opposed in pairs around the pressure plate 19, which is generally of circular shape.

In general, six lifting screws located at 60° from one another about the axis of the central opening of the plate 19 are used.

The use of an even number of screws makes it difficult to balance the tightening of the various screws.

Furthermore, the tightening of one screw to a certain torque interferes with the tightening of the adjacent screws, as indicated earlier.

This results in it being very difficult to obtain effective and constant tightening of the lifting screws of the pressure plate.

Furthermore, manual tightening and balancing of the six lifting screws of the pressure plate by an operator requires an operating time, per thermocouple column, which may be of the order of 10 to 15 minutes.

When these operations are carried out within the scope of a maintenance and refuelling run of a nuclear reactor, which is the most frequent case, the operator is exposed to a dose of radiation coming from the adapter and from the bottom surface of the head, during the entire time necessary for sealed clamping of the thermocouple columns.

Furthermore, bottom ends of the lifting screws 20 come to bear directly on the top part of the support assembly 8, which does not, strictly speaking, constitute an element of the clamping device. This top part of the support assembly 8 may be marked under the effect of the contact pressure of the screws, and may exhibit a shape or behavior which does not lend itself to producing effecting clamping.

Figure 2:
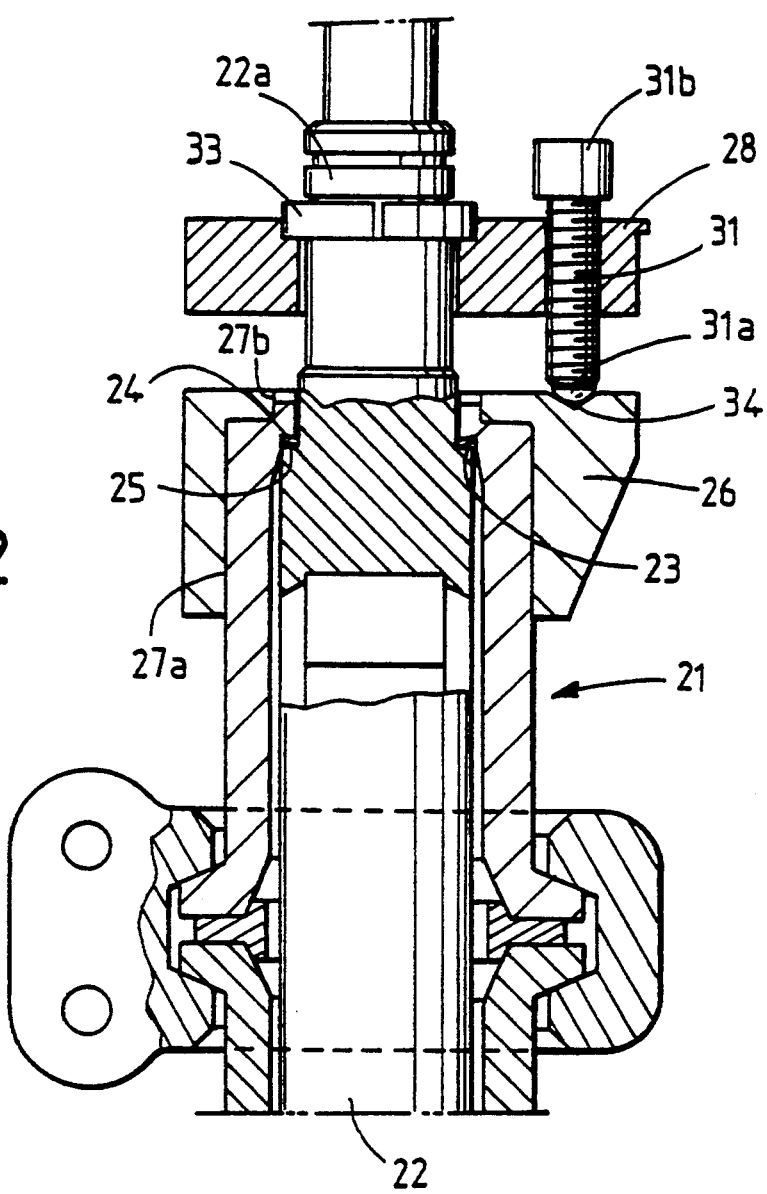
FIG. 2 is a view in section through a vertical plane of the top part of a thermocouple column which is placed in the sealed clamped position using a device according to the invention.

FIG. 2 shows the top end of the support assembly of a thermocouple column, and the part of a clamping device according to the invention remaining in place on the support assembly, after sealed clamping of the thermocouple column.

The support assembly 21 and the thermocouple column 22 have a shape identical to the one which has been described with reference to FIG. 1 relating to a clamping device according to the prior art.

The tubular support assembly 21 through which the thermocouple column 22 passes includes a frustoconical support surface 23, the thermocouple column 22 itself including a frustoconical bearing surface 24 in a corresponding position.

In the sealed clamped position of the thermocouple column represented in FIG. 2, a frustoconical seal 25 is crushed between the support surfaces 23 and 24.

The part of the clamping device according to the invention remaining in position on the support assembly 21 in the clamped position of the thermocouple column 22 includes a supporting endpiece 26 traversed by a two-part central opening 27, the bottom part 27a of the central opening 27a having a large diameter engaging practically without clearance on the top part of the support assembly 21. The top part 27b of the central opening, of smaller diameter, has a diameter which is greater than the usual diameter of the top part projecting above the support assembly 21 of the thermocouple column 22.

Figure 3:
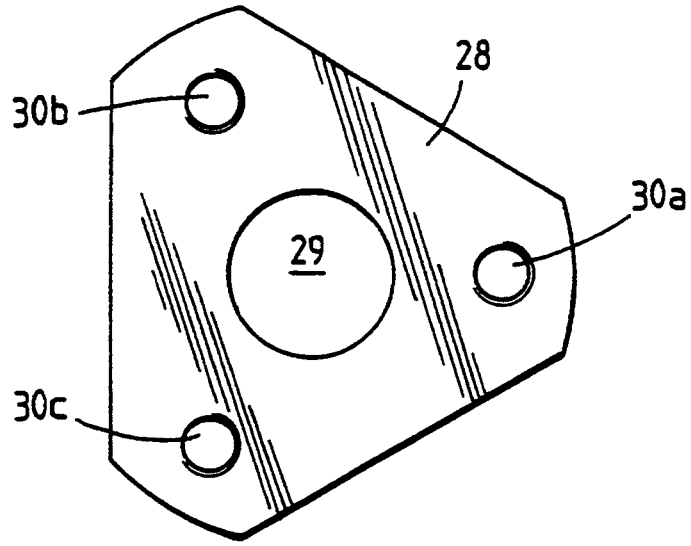
FIG. 3 is a plan view of the pressure plate of the clamping device represented in FIG. 2.

The remaining part of the clamping device additionally includes a pressure plate 28 which can be seen in FIGS. 2 and 3, and which is traversed by a circular central opening 29 whose diameter is substantially equal to the diameter of the projecting part of the thermocouple column on which the plate 28 may be engaged, practically without clearance.

As can be seen in FIG. 3, the pressure plate 28 has the shape of an equilateral triangle whose vertices are truncated and rounded.

The endpiece 26 has a shape and dimensions which are identical to the shapes and dimensions of the pressure plate 28.

The pressure plate 28 is traversed by three tapped circular holes 30a, 30b and 30c, in each one of which a lifting screw 31 is engaged.

Each of the lifting screws 31 includes a first end 31a coming to bear on the top surface of the endpiece 26 and a second end 31b including a part which is shaped to receive a tightening tool.

As can be seen in FIG. 2, the part of the device for clamping the thermocouple column, which remains in place, also includes a pull-ring 33 made up of two half-rings which can be engaged laterally in a groove machined in the thermocouple column, so as to come to bear on a projecting annular part 22a of the thermocouple column so as to provide upward thrust on the thermocouple column.

The two half-rings constituting the pull-ring 33 have an external diameter which is greater than the diameter of the hole for passing through the pressure plate 28 which is substantially equal to the usual diameter of the thermocouple column, and an internal diameter which is less than the usual diameter of the thermocouple column 22.

As can be seen in FIGS. 2 and 3, the pressure plate and the thermocouple column are lifted by three screws 31, each engaged in a tapped opening 30a, 30b or 30c of the pressure plate 28, this opening being located near a truncated corner of the equilateral triangle, and ends 31a of the bearings screws on the supporting end-piece 26.

The axes of tapped holes 30a, 30b, 30c and the corresponding screws 31 are parallel to the axis of the central opening of the turning plate and of the thermocouple column 22, when the turning plate is in the clamped position, and are located equidistant and at 120° from each other with respect to the axis of the opening 29 of the pressure plate which coincides with the axis of the thermocouple column 22.

Perfectly balanced clamping is thus obtained, and the bearing of the screws on the end-piece 26, which is installed before clamping the thermocouple column, makes it possible to obtain a perfectly matched support surface. This support surface includes recesses 34 which may be constituted by frustoconical cavities in which the end parts 31a of the screws 31 engage, which end parts may have the shape of a spherical cap, as can be seen particularly in FIG. 5.

Figure 4:
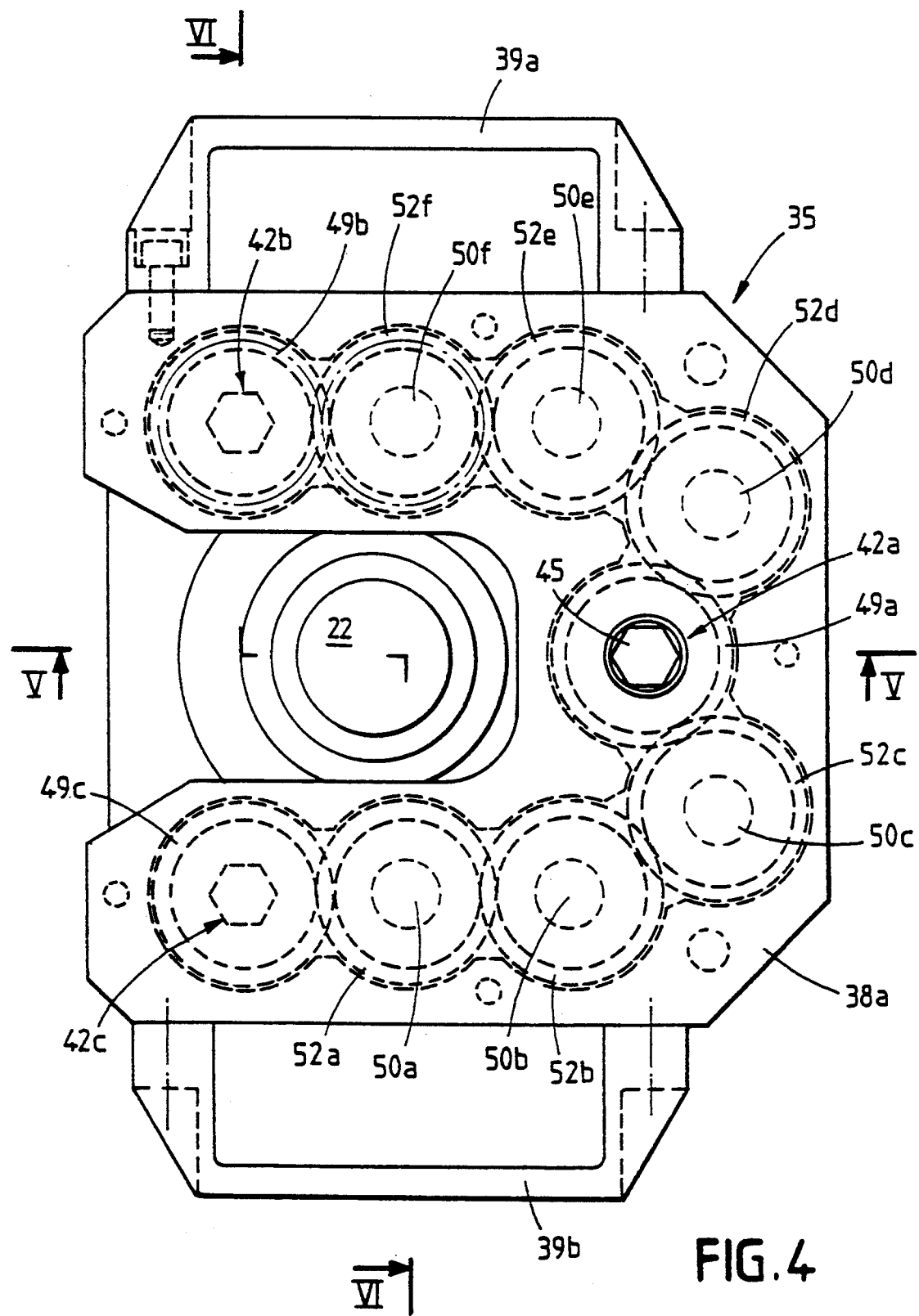
FIG. 4 is a plan view of a clamping device according to the invention, in clamped position on a thermocouple column.
Figure 5:
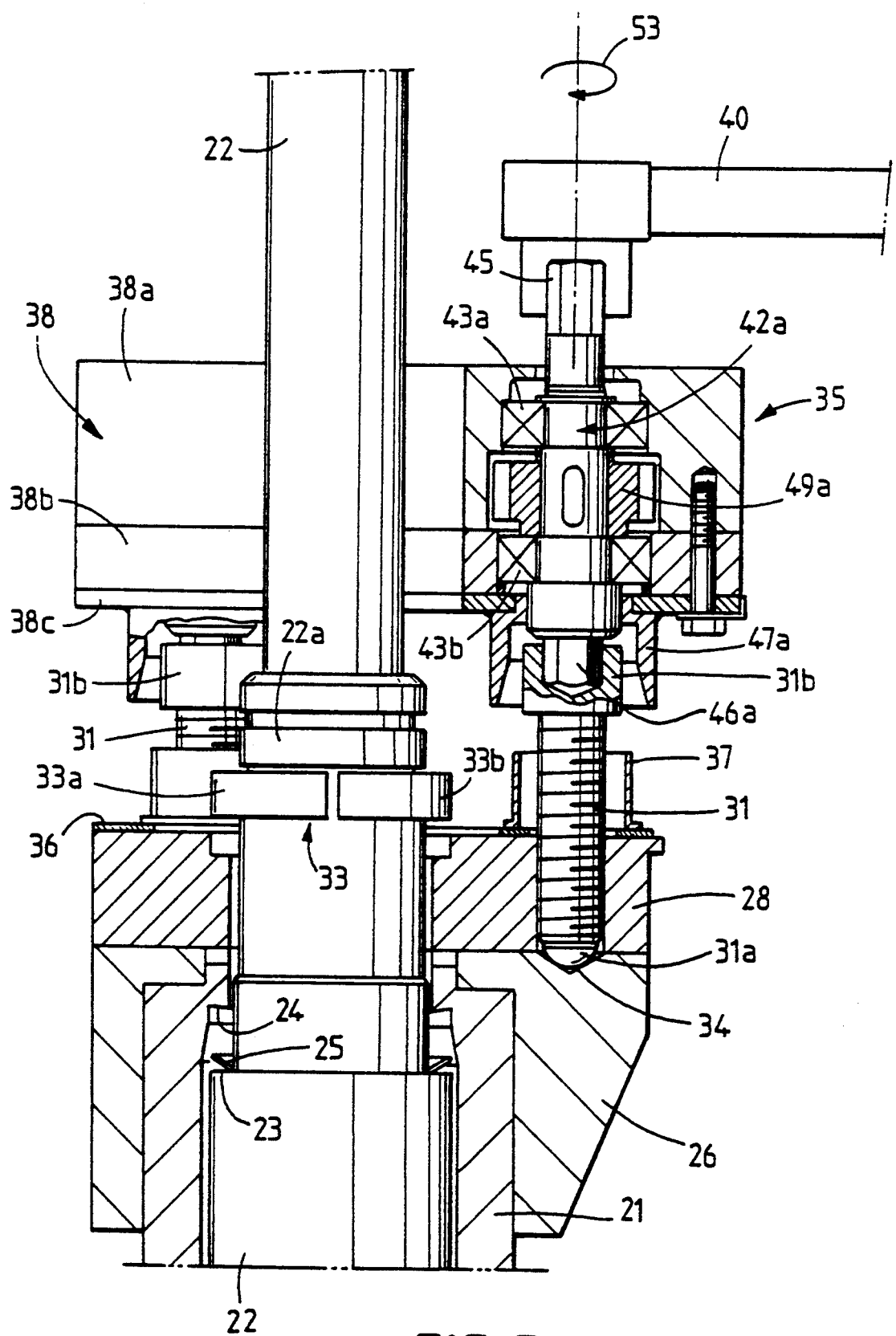
FIG. 5 is a view, in elevation and in partial section along line 5—5 of FIG. 4.
Figure 6:
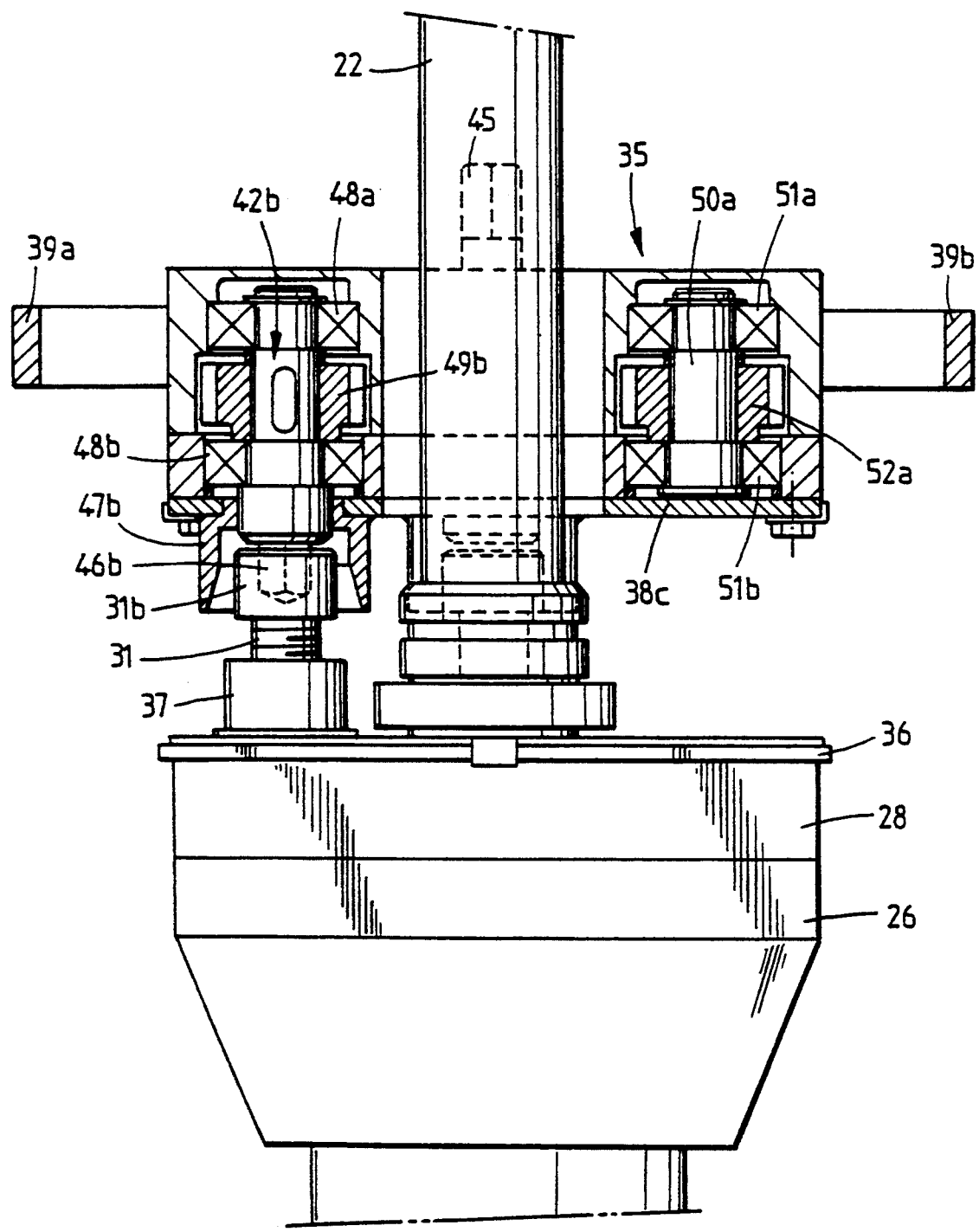
FIG. 6 is a view in elevation and in partial section along line 6—6 of FIG. 4.

Reference will now be made to FIGS. 4 to 6 for describing the removable part of the clamping device used for maneuvering the lifting screws, and the installation of the clamping elements remaining permanently on the support assembly of the adapter.

As can be seen in FIGS. 4, to 6, the clamping device according to the invention, in addition to the pressure plate 28, the end-piece 26 and the pullring 33, includes a removable clamping assembly 35 and a manual tightening tool 40 for tightening the lifting screws 31 of the pressure plate 28.

The installation of the various elements of the device according to the invention is performed in the following manner.

The thermocouple column 22 is placed in the bottom position, represented in FIG. 5, inside the support assembly 21, with the support surfaces 23 and 24 being separated from one another by a certain vertical distance, and the sealing gasket 25 bearing on the shoulder 23 of the thermocouple column 22.

The supporting endpiece 26 is engaged over the top part of the thermocouple column 22, then over the top part of the support assembly 21, on which it rests in a stable manner.

The pressure plate 28 is engaged over the thermocouple column 22 via its top part, so as to come to rest via its bottom face on the top support face of the endpiece 26. The plate 28 is placed in an orientation which corresponds to the orientation of the endpiece 26, these two elements having the shape of equilateral triangles.

The lifting screws 31 of the pressure plate 28 are placed in a top position, as represented in FIG. 5, in which the spherical-cap-shaped supporting bottom end 31a of the screws 31 projects slightly from the bottom face of the plate 28. When the plate 28 is installed on the endpiece 26, the bottom supporting parts 31a of the screws 31 become engaged in the frustoconical openings 34 of the support surface of the endpiece 26.

A protection panel 36, on which three ferrules 37 are fixed, covers the top surface of the pressure plate 28, the screws 31 being engaged inside the protection ferrules 37.

The panel 36, which has a contour identical to that of the plate 28, has a central opening whose dimensions are substantially greater than those of the central opening of the plate 28.

The pull-ring 33 made in two parts 33a, 33b, is installed laterally inside the groove of the thermocouple column 22, below the projecting annular part 22a.

The clamping assembly 35 is then engaged over the top part of the thermocouple column so as to engage with the screws 31 and tighten them by actuation of the tool 40.

The clamping assembly 35 includes a mounting plate 38 made up of three superposed parts 38a, 38b and 38c of different thicknesses. The three panels constituting the mounting plate 38 have a U-shaped cross-section as represented in FIG. 4, which shows the top panel 38a.

On the two opposite outer faces of the panel 38a, along the two branches of the U, there are fixed two handles 39a and 39b allowing handling of the clamping assembly 35, for engaging it over the thermocouple column and installing it above the pressure plate 28.

The handles 39a and 39b may be fixed onto the top surface of the panel 38a of the mounting plate 38, in the event of operating in a restricted space requiring reduced lateral bulk of the clamping assembly 35.

The clamping assembly 35 includes three actuation spindles 42a, 42b and 42c which are mounted rotationally in holes passing through the mounting plate 38 in a direction which is perpendicular to the faces of the superposed panels 38a, 38b, 38c.

As can be seen in FIG. 5, the spindle 42a is mounted rotationally by means of two rolling-contact bearings 43a and 43b fixed respectively to the inside of the panel 38a and panels 38b, respectively, of the mounting plate 38.

Between the rolling-contact bearings 43a and 43b, the spindle 42a is securely fastened to a gear 49a.

The spindle 42a includes a first shaped part 45 of hexagonal cross-section projecting above the top panel 38a of the mounting plate 38, and a second shaped part 46a of hexagonal cross-section projecting below the bottom face of the bottom panel 38c of the mounting plate 38, inside an engagement and protection ferrule 47a.

The spindles 42b and 42c are identical, so that the description of the spindle 42b, which will be given with reference to FIG. 6, applies equally to spindle 42c.

The spindle 42b is mounted rotationally inside the mounting plate 38, in an opening whose direction is perpendicular to the faces of the panels making up the mounting plate 38. The spindle 42b is mounted rotationally by means of two rolling-contact bearings 48a and 48b mounted respectively inside the panel 38a and inside the panel 38b of the mounting plate 38.

Between the rolling-contact bearing 48a and 48b, the spindle 42b is securely fastened to a gear 49b.

The spindle 42c is securely fastened to a corresponding gear 49c referenced in FIG. 4.

The spindle 42b includes a shaped part 46b of hexagonal cross-section projecting below the bottom face of the panel 38c of the mounting plate 38, inside an engagement and protection ferrule 47b.

The shaped parts 46a of the spindle 42a and 46b of the spindle 42b, as well as the corresponding shaped end part of the spindle 42c, have a shape and dimensions allowing them to be engaged inside a six-head socket-shaped part inside the screw heads 31b, the engagement of the shaped parts such as 46a and 46b inside the screw heads 31b taking place when the clamping assembly 35 is installed above the pressure plate 28. The engagement ferrules such as 47a and 47b make it possible to facilitate the installation of the clamping assembly over the lifting screws of the pressure plate.

Six mutually parallel shafts 50a, 50b, 50c, 50d, 50e, 50f are also mounted in openings inside the mounting plate 38, the parallel shafts 50a, . . . 50f being parallel to the spindles 42a, 42b, 42c.

The shafts 50a, . . . 50f are all mounted in the same way inside the mounting plate 38 so that only the shaft 50a will be described, with reference to FIG. 6.

The shaft 50a is mounted rotationally inside the mounting plate 38, by means of rolling-contact bearings 51a mounted inside the panel 38a and 51b mounted inside the panel 38b.

Between the rolling-contact bearings 51a and 51b the shaft 50a carries a gear 52a.

As can be seen in FIG. 4, the shafts 50a, 50b, 50c, 50d, 50e, 50f are respectively securely fastened to gears 52a, 52b, 52c, 52d, 52e, 52f which are all identical in diameter and diametral pitch.

The gears 52a, . . . 52f are also identical, in diameter and diametric pitch, to the three gears 49a, 49b, 49c which are respectively securely fastened to the spindles 42a, 42b, 42c.

As can be seen in FIG. 4, the gears 49a, 49b, 49c and 52a, . . . 52f mesh with one another in a sequential arrangement, the gears 52a, 52b, 52c which mesh with one another in this order being interposed between the gears 49c and 49a and the gears 52d, 52e, 52f which mesh with one another in this order being interposed between the gears 42a and 49b.

When the clamping assembly 39 is arranged above the pressure plate, as represented in FIGS. 5 and 6, the shaped parts 46a, 46b, 46c of the shafts 42a, 42b, 42c being engaged in the corresponding hollow shaped parts of the screw heads 31b, a tool such as a box spanner 40 is engaged over the top shaped part 45 of the spindle 42a, and is rotated in the direction indicated by arrow 53, so as to turn the spindle 42a and the screw 31 in the direction corresponding to screwing the screw 31 into the tapped hole 30a of the pressure plate 28.

By means of the gears 52c, 52b and 52a, the shaft 42c is rotationally driven at the same speed and in the same direction as the shaft 42a.

Likewise, by means of the gears 52d, 52e, 52f, the shaft 42b, which is securely fastened to the gear 49b is rotationally driven at the same speed and in the same direction as the shaft 42a.

The three screws 31 of the pressure plate 28 are therefore screwed in the same way and simultaneously into the tapped holes 30a, 30b, 30c. The plate 28 rises evenly, and comes into contact with the pull-ring 33 by means of which the thermocouple column 22 is raised until the moment at which the seal 25 is in its maximum crushed state between the shoulder 23 and the frustoconical bearing surface 24. This maximum crushed state of the seal is obtained in an even, simple and quick manner by actuating the spindle 42a by means of the tool 40. The time necessary for the sealed clamping of the thermocouple column is therefore considerably reduced by using the clamping device according to the invention. The displacement of the pressure plate and its clamping are produced identically at any point on the periphery of the plate in which the three screws 31, with balanced tightening, are engaged.

When the clamping of the thermocouple column is completed, the clamping assembly 35 is lifted by means of the handles 39a and 39b so as to separate it from the pressure plate, then extracted through the top part of the thermocouple column.

As indicated hereinabove, the pressure plate, the supporting endpiece and the pull-ring remain in place in order to hold the thermocouple column in the sealed clamped position.

The clamping assembly 35 and the spanner 40 may be used to perform a new sealed clamping operation of a thermocouple column passing through the head via a second adapter.

Preferably, the spanner 40 is a torque wrench, making it possible to tighten the lifting screws to a specific torque.

The device according to the invention makes it possible to achieve, very effectively and quickly, the sealed clamping of an instrumentation column such as a thermocouple column passing through an adapter passing through the vessel head of a nuclear reactor.

The pressure plate and the endpiece resting on the top part of the support assembly may have a shape other than the shape of an equilateral triangle with rounded corners.

The number of lifting screws used may be greater than three, so long as their number is an odd number.

A clamping assembly other than the assembly which has been described hereinabove may be used, this assembly being suited to the arrangement and to the number of lifting screws of the pressure plate. The synchronous rotation of the shaft driven by the tightening tool may be transmitted by means other than a chain of identical gears meshing with one another.

The driving shaft of the clamping device may be rotationally driven by a means other than a torque wrench.

Finally, the invention applies to the clamping of any instrumentation column passing through the head of the vessel of a nuclear reactor, inside an adapter.

I claim:

1. In a pressurized-water nuclear vessel, having a head, a plurality of tubular adapters, each fixed into an opening traversing said head, and at least one instrumentation column passing though one adapter of said plurality of adapters, a device for sealed clamping of said instrumentation column against a support surface of a tubular support assembly fixed to an end of said one adapter located outside said head and in an extension of said one adapter, said clamping device comprising:
   (a) a pressure plate having a central opening through which said instrumentation column can pass;
   (b) a removable supporting end piece coming to rest on an end of said support assembly opposite to said adapter having a central opening for passage of said instrumentation column;
   (c) an odd number of lifting screws, each lifting screw being engaged in a tapped hole traversing said pressure plate and comprising a supporting end bearing on said supporting end piece and an opposite end constituting an engagement means for rotating said lifting screw, said lifting screws being distributed about an axis of symmetry of said central opening of said pressure plate and parallel to said axis;
   (d) a pull-ring comprising two half rings coming to bear between a radially projecting part of said instrumentation column and said pressure plate;
   (e) a tightening assembly including a mounting plate having an opening for passage of said instrumentation column and an odd number at least equal to three of tightening spindles distributed around and parallel to an axis of said opening of said mounting plate, each of said spindles having an end configured for engaging an engagement means for rotating one lifting screw of said pressure plate, each of said spindles being mounted rotationally on said mounting plate and securely fastened to gears in kinematic connection so as to be rotated in a same direction upon rotation of one of said spindles, called a driving spindle, which includes a shaped drive part; and,
   (f) a tool for rotationally driving said driving spindle.

2. Device according to claim 1, wherein said supporting end piece and said pressure plate have the shape of a regular polygon with an odd number of sides.

3. Device according to claim 2, wherein said supporting end piece and said pressure plate have the shape of equilateral triangles with rounded corners.

4. Device according to claim 3, wherein each said tapped hole traversing said pressure plate is located adjacent said rounded corners.

5. Device according to any one of claims 1 to 3, wherein said tightening assembly comprises three spindles each securely fastened to identical gears, said driving spindle including the shaped drive part being kinematically linked to each of two other tightening spindles, by a kinematic chain of an odd number of gears, identical to gears securely fastened to the three tightening spindles and meshing successively with one another and with the gears of the tightening spindles.

6. Device according to claim 5, wherein each of the kinematic chains for driving said tightening spindles includes three gears securely fastened to shafts mounted so as to idle on said mounting plate of said tightening assembly.

7. Device according to claim 5, wherein said tool for rotationally driving said driving spindle including said shaped part is a torque wrench.

8. Device according to claim 5, wherein said tightening assembly includes two manipulating handles attached to said mounting plate.

9. Device according to claim 1, wherein said removable supporting end piece includes a top support surface containing at least three recesses receiving supporting ends of said lifting screws of said pressure plate.

* * * * *